United States Patent
Piao et al.

(10) Patent No.: US 11,384,108 B2
(45) Date of Patent: Jul. 12, 2022

(54) TRANSITION METAL COMPOUND FOR OLEFIN POLYMERIZATION CATALYST, OLEFIN POLYMERIZATION CATALYST INCLUDING SAME, AND POLYOLEFIN POLYMERIZED BY USING OLEFIN POLYMERIZATION CATALYST

(71) Applicant: Hanwha Solutions Corporation, Seoul (KR)

(72) Inventors: Lan Hua Piao, Seoul (KR); Hee Ju Yang, Daejeon (KR); Na Young Park, Daejeon (KR); Seong Yeon Park, Daejeon (KR); Wook Jeong, Daejeon (KR)

(73) Assignee: Hanwha Solutions Corporation, Seoul (KR)

( * ) Notice: Subject to any disclaimer, the term of this patent is extended or adjusted under 35 U.S.C. 154(b) by 0 days.

(21) Appl. No.: 16/770,176

(22) PCT Filed: Mar. 15, 2019

(86) PCT No.: PCT/KR2019/003016
§ 371 (c)(1),
(2) Date: Jun. 5, 2020

(87) PCT Pub. No.: WO2019/182290
PCT Pub. Date: Sep. 26, 2019

(65) Prior Publication Data
US 2021/0017209 A1    Jan. 21, 2021

(30) Foreign Application Priority Data
Mar. 21, 2018 (KR) .................. 10-2018-0032806

(51) Int. Cl.
| C07F 17/00 | (2006.01) |
| C08F 4/6592 | (2006.01) |
| C08F 210/16 | (2006.01) |
| C08F 4/52 | (2006.01) |

(52) U.S. Cl.
CPC ............... *C07F 17/00* (2013.01); *C08F 4/52* (2013.01); *C08F 4/65922* (2013.01); *C08F 4/65927* (2013.01); *C08F 210/16* (2013.01)

(58) Field of Classification Search
CPC ..... C07F 17/00; C08F 4/65927; C08F 210/16
See application file for complete search history.

(56) References Cited

U.S. PATENT DOCUMENTS

| 5,451,649 | A * | 9/1995 | Zenk .................. B01J 31/143 |
| | | | 526/160 |
| 6,469,188 | B1 | 10/2002 | Miiler et al. |
| 7,141,632 | B2 | 11/2006 | Vaughan et al. |
| 10,040,884 | B2 | 8/2018 | Harada et al. |
| 10,329,366 | B2 | 6/2019 | Harada et al. |
| 2003/0139284 | A1 | 7/2003 | Tsai et al. |
| 2015/0051360 | A1 | 2/2015 | Praetorius et al. |
| 2015/0299352 | A1 | 10/2015 | Sohn et al. |
| 2021/0171559 | A1 | 6/2021 | Lee et al. |

FOREIGN PATENT DOCUMENTS

| EP | 0672675 A1 | 9/1995 |
| JP | 2007197722 A | 8/2007 |
| JP | 2016188318 A | 11/2016 |
| JP | 2021507977 A | 2/2021 |
| KR | 20040053098 A | 6/2004 |
| KR | 20170057965 A | 5/2017 |
| WO | 2015147215 A1 | 10/2015 |

OTHER PUBLICATIONS

Japanese Notice of Reasons for Refusal issued in Japanese Application No. 2020-550825, dated Aug. 12, 2021 with translation, 12 pages.
International Search Report and Written Opinion for International Application No. PCT/KR2019/003016, dated Jul. 3, 2019, 10 pages.
Korean Office Action for Korean Application No. 10 2018 0032806, dated May 9, 2020, 7 pages.
Supplementary European Search Report issued in European Patent Application EP18876054.0, dated Sep. 29, 2021, 6 pages.
Japanese Notice of Reasons for Refusal for Japanese Application No. 2020-544723, dated Jun. 15, 2021, with translation, 6 pages.
International Search Report and Written Opinion for International Application No. PCT/KR2018/013250, dated Feb. 11, 2019, 11 pages.
USPTO Non Final Office Action for U.S. Appl. No. 16/762,693, dated Nov. 26, 2021, 15 pages.
USPTO Final Office Action for U.S. Appl. No. 16/762,693, dated Apr. 14, 2022, 8 pages.

* cited by examiner

*Primary Examiner* — Caixia Lu
(74) *Attorney, Agent, or Firm* — RatnerPrestia

(57) ABSTRACT

The present invention relates to a transition metal compound for an olefin polymerization catalyst, represented by chemical formula 1. The description of chemical formula 1 is as described in the specification.

4 Claims, No Drawings

TRANSITION METAL COMPOUND FOR OLEFIN POLYMERIZATION CATALYST, OLEFIN POLYMERIZATION CATALYST INCLUDING SAME, AND POLYOLEFIN POLYMERIZED BY USING OLEFIN POLYMERIZATION CATALYST

CROSS REFERENCE TO RELATED APPLICATIONS

This application is the U.S. National Phase Application of PCT/KR2019/003016, filed Mar. 15, 2019, which claims priority to Korean Patent Application No. 10-2018-0032806, filed Mar. 21, 2018, the contents of such applications being incorporated by reference herein.

FIELD

The present invention relates to a transition metal compound for an olefin polymerization catalyst, an olefin polymerization catalyst comprising the same, and a polyolefin polymerized using the same.

BACKGROUND

Metallocene catalyst, which is one of the catalysts used to polymerize olefins, is a compound, in which a ligand such as a cyclopentadienyl group, an indenyl group, or a cycloheptadienyl group is coordinate bonded to a transition metal or a transition metal halogen compound, and has a sandwich structure in its basic form.

The metallocene catalyst is a single-site catalyst comprising the metallocene compound and a cocatalyst, such as methylaluminoxane, and the polymer polymerized with the metallocene catalyst has a narrow molecular weight distribution and the uniform distribution of the monomer, and the copolymerization activity higher than that of the Ziegler-Natta catalyst.

However, since there are still many difficulties in commercial use, a manufacturing technique based on the development of a catalyst with high stability even at high temperatures or excellent reactivity with olefins and the economical efficiency is required.

SUMMARY

The problem to be solved by the present invention is to provide a transition metal compound for an olefin polymerization catalyst, an olefin polymerization catalyst having high stability even at high temperature and excellent reactivity with an olefin, including the transition metal compound for an olefin polymerization catalyst, and a polyolefin polymerized using the same, which has excellent properties such as low density and high molecular weight.

The problems of the present invention are not limited to the technical problems mentioned above, and other technical problems that are not mentioned will be clearly understood by those skilled in the art from the following description.

The transition metal compound for an olefin polymerization catalyst according to an embodiment of the present invention for solving the above problem is represented by the following chemical formula 1.

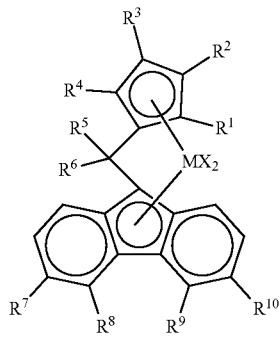

<chemical formula 1>

(In the chemical formula 1, M is titanium (Ti), zirconium (Zr) or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl, $C_{6-20}$ aryl, $C_{6-20}$ aryl $C_{1-20}$ alkyl, $C_{1-20}$ alkylamido, $C_{6-20}$ arylamido or $C_{1-20}$ alkylidene, $R^1$ to $R^4$ are each independently hydrogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, $R^5$ and $R^6$ are each independently $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, or linked to each other to form a substituted or unsubstituted $C_{4-20}$ ring, $R^7$ to $R^{10}$ form a substituted or unsubstituted $C_{4-20}$ ring, in which two adjacent ones are linked to each other)

Specifically, the X is each independently halogen or $C_{1-20}$ alkyl, the $R^1$, $R^3$ and $R^4$ are each hydrogen, the $R^2$ is $C_{1-20}$ alkyl, the $R^5$ and $R^6$ are each independently $C_{1-20}$ alkyl or $C_{6-20}$ aryl, or linked to each other to form a substituted or unsubstituted aliphatic $C_{4-20}$ ring, and the $R^7$ to $R^{10}$ form a substituted or unsubstituted aromatic $C_{5-20}$ ring, in which two adjacent ones are linked to each other.

More specifically, the $R^5$ and $R^6$ are each independently methyl, or linked to each other to form a substituted or unsubstituted aliphatic $C_{4-20}$ ring.

Further, the $R^7$ to $R^{10}$ form a substituted or unsubstituted aromatic $C_6$, in which two adjacent ones are linked to each other.

For example, the chemical formula 1 may be represented by the following chemical formula 1-1 or chemical formula 1-2.

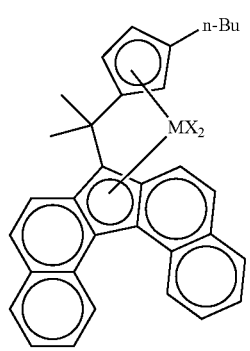

<chemical formula 1-1>

-continued

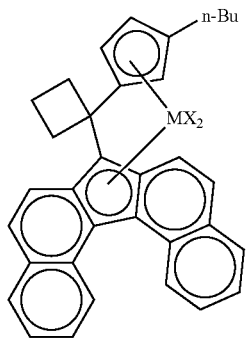

<chemical formula 1-2>

(In the chemical formula 1-1 and chemical formula 1-2, M is zirconium or hafnium, and X is each independently halogen or $C_{1-20}$ alkyl)

More specifically, the chemical formula 1 may be the following chemical formula A or chemical formula B.

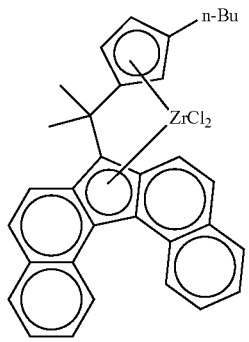

<chemical formula A>

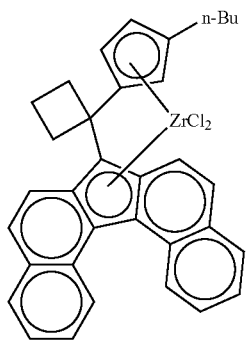

<chemical formula B>

The olefin polymerization catalyst according to another embodiment of the present invention for solving the above problems comprises a transition metal compound represented by the following chemical formula 1; and a cocatalyst compound.

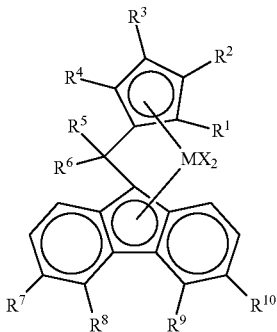

<chemical formula 1>

(In the chemical formula 1, M is titanium (Ti), zirconium (Zr) or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, $R^1$ to $R^4$ are each independently hydrogen, $C_{1-20}$ alkyl, $C_{2-20}$ alkenyl, $C_{2-20}$ alkynyl, $C_{6-20}$ aryl, $C_{1-20}$ alkyl, $C_{6-20}$ aryl, $C_{6-20}$ aryl $C_{1-20}$ alkyl, $C_{1-20}$ alkylamido, $C_{6-20}$ arylamido or $C_{1-20}$ alkylidene, $R^5$ and $R^6$ are each independently $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, or linked to each other to form a substituted or unsubstituted $C_{4-20}$ ring, $R^7$ to $R^{10}$ form a substituted or unsubstituted $C_{4-20}$ ring, in which two adjacent ones are linked to each other)

Here, the X is each independently halogen or $C_{1-20}$ alkyl, the $R^1$, $R^3$ and $R^4$ are each hydrogen, the $R^2$ is $C_{1-20}$ alkyl, the $R^5$ and $R^6$ are each independently $C_{1-20}$ alkyl or $C_{6-20}$ aryl, or linked to each other to form a substituted or unsubstituted aliphatic $C_{4-20}$ ring, the $R^7$ to $R^{10}$ form a substituted or unsubstituted aromatic $C_{5-20}$, in which two adjacent ones are linked to each other.

Specifically, the chemical formula 1 may be the following chemical formula 1-1 or chemical formula 1-2.

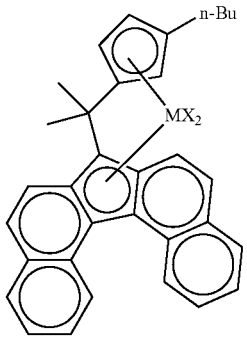

<chemical formula 1-1>

-continued

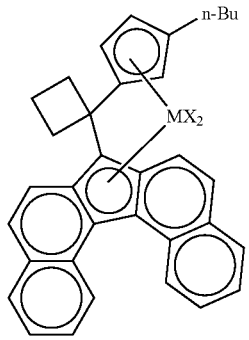

<chemical formula 1-2>

(In the chemical formula 1-1 and chemical formula 1-2, M is zirconium or hafnium, and X is each independently halogen or $C_{1-20}$ alkyl)

Further, the cocatalyst compound may comprise at least one of a compound represented by the following chemical formula I, a compound represented by the chemical formula II and a compound represented by the chemical formula III.

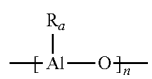

<chemical formula I>

(In the chemical formula A, n is an integer of 2 or more, $R_a$ is a halogen atom, a $C_{1-20}$ hydrocarbon group or a $C_{1-20}$ hydrocarbon group substituted with halogen)

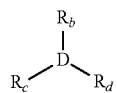

<chemical formula II>

(In the chemical formula B, D is aluminum (Al) or boron (B), $R_b$, $R_c$ and $R_d$ are each independently a halogen atom, a $C_{1-20}$ hydrocarbon group, a $C_{1-20}$ hydrocarbon group substituted with halogen or a $C_{1-20}$ alkoxy group)

$[L-H]^+[Z(A)_4]^-$ or $[L]^+[Z(A)_4]^-$   <chemical formula III>

(In the chemical formula C, L is a neutral or cationic Lewis base, $[L-H]^+$ and $[L]^+$ are Brønsted acids, Z is a group 13 element, and A is each independently a substituted or unsubstituted $C_{6-20}$ aryl group or a substituted or unsubstituted $C_{1-20}$ alkyl group)

The olefin-based polymer according to another embodiment of the present invention for solving the above problems is formed by polymerization under the olefin polymerization catalyst according to the other embodiment.

Here, the olefin-based polymer may be formed by copolymerizing an olefin-based monomer and an olefin-based comonomer.

Specifically, the olefin-based monomer and the olefin-based comonomer may be ethylene and 1-hexene, respectively.

Specific details of other embodiments are included in the detailed description.

Embodiments according to the present invention have at least the following effects.

The olefin polymerization catalyst having high stability even at high temperatures and reactivity with an olefin can be prepared by including the transition metal compound of the present invention, and the polyolefin polymerized using the same can have excellent properties such as low density and high molecular weight.

Further, the olefin polymerization catalyst comprising the transition metal compound of the present invention has a high synthetic yield and can be easily prepared by an economical method, and thus has excellent commercial practicality.

Effects of the embodiments according to the present invention are not limited by the contents illustrated above, and more various effects are included in the present specification.

DETAILED DESCRIPTION

Advantages and features of the present invention, and methods for achieving them will be clarified with reference to embodiments described below in detail together with the accompanying drawings. However, the present invention is not limited to the embodiments disclosed below, but will be implemented in various different forms, and the present embodiments is merely provided to allow the disclosure of the present invention to be complete, and fully inform the ordinary knowledge in the technical field to which the present invention pertains on the scope of the invention, and the invention is only defined by the scope of the claims.

In this specification, the term "$C_{A-B}$" means "the carbon number is A or more and B or less," and the term "A to B" mean "A or more and B or less" and, in the term "substituted or unsubstituted," "substituted" means that "at least one hydrogen of a hydrocarbon compound or hydrocarbon derivative is substituted with halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, and "unsubstituted" means "at least one hydrogen of a hydrocarbon compound or hydrocarbon derivative is not substituted with halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene."

The transition metal compound for an olefin polymerization catalyst according to an embodiment of the present invention may be represented by the following chemical formula 1.

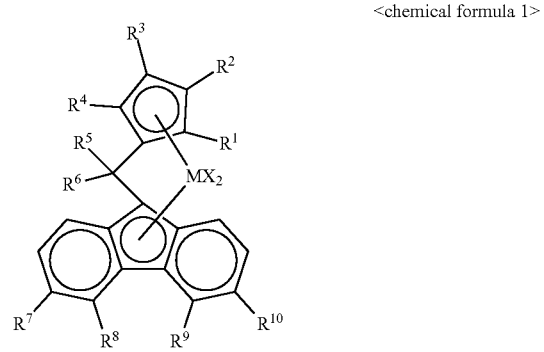

<chemical formula 1>

In the chemical formula 1, M may be titanium (Ti), zirconium (Zr), or hafnium (Hf). Specifically, M may be zirconium or hafnium.

X may be each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene. Specifically, X may be each independently halogen or $C_{1-20}$ alkyl. More specifically, X may be each independently chlorine (Cl) or methyl.

$R^1$ to $R^4$ are each independently hydrogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene. Specifically, $R^1$, $R^3$ and $R^4$ are each hydrogen, and $R^2$ may be $C_{1-20}$ alkyl. More specifically, $R^1$, $R^3$ and $R^4$ may be each hydrogen, and $R^2$ may be n-butyl.

$R^5$ and $R^6$ may be each independently $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido or $C_{1-20}$ alkylidene, or may be linked to each other to form a substituted or unsubstituted $C_{4-20}$ ring. Specifically, $R^5$ and $R^6$ may be each independently $C_{1-20}$ alkyl or $C_{6-20}$ aryl, or may be linked to each other to form a substituted or unsubstituted aliphatic $C_{4-20}$ ring. More specifically, $R^5$ and $R^6$ may be each independently methyl or linked to each other to form an aliphatic $C_4$ ring.

$R^7$ to $R^{10}$ may form a substituted or unsubstituted $C_{4-20}$ ring, in which two adjacent ones are linked to each other. Specifically, $R^7$ to $R^{10}$ may form a substituted or unsubstituted aromatic $C_{5-20}$ ring, in which two adjacent ones are linked to each other. More specifically, $R^7$ to $R^{10}$ may form a substituted or unsubstituted aromatic $C_6$ ring, in which two adjacent ones are linked to each other. Two adjacent ones of $R^7$ to $R^{10}$ may mean $R^7$ and $R^8$ or $R^9$ and $R^{10}$.

The aromatic $C_6$ ring may be substituted with one or more of halogen, $C_{6-20}$ aryl, $C_{1-20}$ alkylsilyl, $C_{1-20}$ alkyloxy and $C_{1-20}$ alkylamino. Specifically, the halogen may be fluorine (F), the $C_{6-20}$ aryl may be phenyl, the $C_{1-20}$ alkylsilyl may be trimethylsilyl (trimethylsilyl, $-SiMe_3$), and the $C_{1-20}$ alkyloxy may be methyloxy (methyloxy[methoxy], $-OMe$), and the $C_{1-20}$ alkylamino may be dimethylamino (dimethylamino, $-NMe_2$).

Specifically, the transition metal compound may be at least one of the following chemical formulas 1-1 and 1-2.

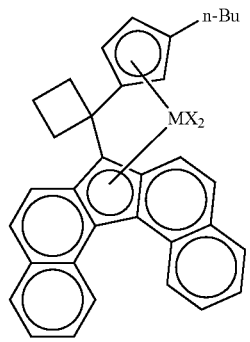

<chemical formula 1-1>

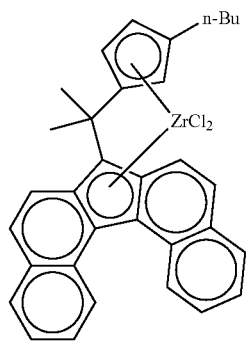

<chemical formula 1-2>

In the chemical formulas 1-1 and 1-2, M may be zirconium or hafnium, and X may be each independently halogen or $C_{1-20}$ alkyl.

In an exemplary embodiment, the transition metal compound may be one or more of the following chemical formula A and chemical formula B.

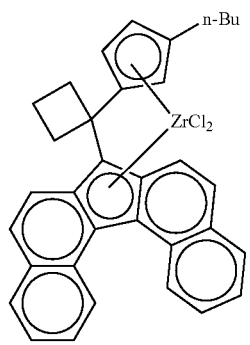

<chemical formula A>

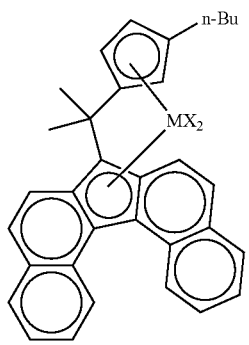

<chemical formula B>

The olefin polymerization catalyst according to an embodiment of the present invention may include one or more of the transition metal compounds illustrated above and a cocatalyst compound.

The cocatalyst compound may include one or more of a compound represented by the following chemical formula I, a compound represented by the chemical formula II and a compound represented by the chemical formula III.

<chemical formula I>

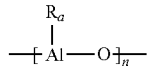

In the chemical formula I, n is an integer of 2 or more, and $R_a$ may be a halogen atom, a $C_{1-20}$ hydrocarbon group, or a $C_{1-20}$ hydrocarbon group substituted with halogen. Specifically, the $R_a$ may be methyl, ethyl, n-butyl or isobutyl, but is not limited thereto.

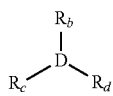

<chemical formula II>

In the chemical formula II, D may be aluminum (Al) or boron (B), and $R_b$, $R_c$, and $R_d$ may be each independently a halogen atom, a $C_{1-20}$ hydrocarbon group, a $C_{1-20}$ hydrocarbon group substituted with halogen, or a $C_{1-20}$ alkoxy group. Specifically, when D is aluminum, the $R_b$, $R_c$ and $R_d$ may be each independently methyl or isobutyl, and when D is boron, the $R_b$, $R_c$ and $R_d$ may be each pentafluorophenyl, but is not limited thereto.

<chemical formula III>

In the chemical formula III, L may be a neutral or cationic Lewis base, $[L-H]^+$ or $[L]^+$ may be Brønsted acid, Z may be a group 13 element, and A may be each independently a substituted or unsubstituted $C_{6-20}$ aryl group or a substituted or unsubstituted $C_{1-20}$ alkyl group. Specifically, the $[L-H]^+$ may be a dimethylanilinium cation, and the $[Z(A)_4]^-$ may be $[B(C_6F_5)_4]^-$, and the $[L]^+$ may be $[(C_6H_5)_3C]^+$, but is not limited thereto.

The olefin polymerization catalyst may further include a carrier.

The carrier is not particularly limited as long as it can carry a transition metal compound for an olefin polymerization catalyst and a cocatalyst compound. In an exemplary embodiment, the carrier may be carbon, silica, alumina, zeolite, magnesium chloride, and the like.

As a method of carrying the transition metal compound for an olefin polymerization catalyst and the cocatalyst compound on the carrier, a physical adsorption method or a chemical adsorption method can be used.

In an exemplary embodiment, the physical adsorption method may be a method, in which a solution of dissolving a transition metal compound for olefin polymerization catalyst is contacted with a carrier and then dried, a method, in which a solution of dissolving a transition metal compound for olefin polymerization catalyst and a cocatalyst compound is contacted with a carrier and then dried, or a method, in which a solution of dissolving a transition metal compound for an olefin polymerization catalyst is contacted with a carrier and then dried, and a carrier carrying a transition metal compound for an olefin polymerization catalyst is prepared, and separately, a solution of dissolving a cocatalyst compound is contacted with a carrier and then dried to prepare a carrier carrying the cocatalyst compound, and then mixing them.

In an exemplary embodiment, the chemical adsorption method may be a method of first carrying a cocatalyst compound on a surface of a carrier, and carrying a transition metal compound for an olefin polymerization catalyst on the cocatalyst compound, or a method of covalently bonding a functional group on the surface of the carrier (e.g., a hydroxy group (—OH) on the silica surface in the case of silica) with a catalyst compound.

The total amount of the carrying amount of the main catalyst compound including the transition metal compound may be 0.001 mmol to 1 mmol based on 1 g of the carrier, and the carrying amount of the cocatalyst compound may be 2 mmol to 15 mmol based on the 1 g of the carrier.

However, such a carrier is not necessarily included, and whether or not to use it can be appropriately selected as necessary.

The polyolefin may be formed by polymerizing the olefin-based monomer under the olefin polymerization catalyst of the present invention as described above.

The polyolefin may be a homopolymer or a copolymer polymerized by polymerization reactions such as free radical, cationic, coordination, condensation, and addition, but is not limited thereto.

In an exemplary embodiment, the polyolefin may be prepared by gas phase polymerization, solution polymerization or slurry polymerization. Examples of the solvent that can be used when the polyolefin is prepared by solution polymerization or slurry polymerization include $C_{5-12}$ aliphatic hydrocarbon solvents such as pentane, hexane, heptane, nonane, decane and isomers thereof; aromatic hydrocarbon solvents such as toluene and benzene; hydrocarbon solvents substituted with chlorine atoms such as dichloromethane and chlorobenzene; and mixtures of them, and the like, but are not limited to these.

The olefin-based monomer may be one or more selected from the group comprising $C_{2-20}$ α-olefin, $C_{1-20}$ diolefin, $C_{3-20}$ cyclo-olefin and $C_{3-20}$ cyclodiolefin.

In an exemplary embodiment, the olefin-based monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, and 1-hexadecene, and the like, and the polyolefin may be a homopolymer comprising only one of olefin-based monomers illustrated above or a copolymer comprising two or more.

Preferably, the polyolefin may be a copolymer, in which ethylene and 1-octene are copolymerized, but is not limited thereto.

The olefin polymerization catalyst comprising the transition metal compound of the present invention has stability at high temperatures and is excellent in reactivity with olefins, particularly α-olefins, so it is easy to polymerize olefins, resulting in high yields of polyolefins, excellent economic efficiency. Further, it is possible to prepare a polyolefin with low density and high molecular weight.

This may be particularly due to the relatively rich electrons when two adjacent ones of $R^7$ to $R^{10}$ of the transition metal compounds of the present invention are linked to each other to form a substituted or unsubstituted aromatic $C_6$ ring, thereby improving the (co) polymerization reactivity of the olefin, but is not limited thereto.

Hereinafter, specific preparation examples of the compounds represented by the chemical formulas A to D among the transition metal compounds for the olefin polymerization catalyst of the present invention will be described.

<Preparation Example 1> Preparation of a Compound of Chemical Formula A

Preparation Example 1-1: Preparation of 1,1'-binaphthyl-2,2'-dicarboxylic acid t-BuLi (15.8 g, 41.1 mmol, 1.7 M in pentane) was added at −78° C. to a solution of 2,2'-dibromo-1,1'-binaphthyl (3.85 g, 9.34 mmol) diluted in THF (40 mL), and then the mixture was stirred for 1 hour. $CO_2$ gas was injected at −78° C. for 3 minutes, and then the temperature was gradually raised to room temperature and stirred for 12 hours. After the reaction was terminated by adding 10% HCl at 0° C., THF was removed under vacuum. The organic layer was separated by extraction with ethyl acetate, and recrystallized with chloroform to obtain 3.49 g (quant.) of 2,2'-dibromo-1,1'-binaphthyl, which is a white solid compound having the following $^1$H-NMR spectrum.

$^1$H-NMR (DMSO-$d_6$, 300 MHz): δ 12.4 (s, 2H), 8.11-8.00 (m, 6H), 7.54 (t, 2H), 7.27 (t, 2H), 6.87 (d, 2H).

Preparation Example 1-2: Preparation of 7H-dibenzo[c,g]fluoren-7-one 1,1'-binaphthyl-2,2'-dicarboxylic acid (3.02 g, 8.82 mmol) prepared in the preparation example 1-1 and acetic anhydride (30 mL) were mixed and stirred at 140° C. for 1 hour 30 minutes. After removing acetic anhydride under vacuum, the remaining reaction solution was stirred at 300° C. for 3 hours. After filtering with dichloromethane, 1.17 g (47%) of 7H-dibenzo[c,g]fluoren-7-one, which is a red solid compound having the following $^1$H-NMR spectrum, was obtained through column chromatography (hexane:dichloromethane=1:1, v/v).

$^1$H-NMR (CDCl$_3$, 300 MHz): δ 8.37-8.33 (m, 2H), 7.92-7.87 (m, 2H), 7.83 (d, 2H), 7.77 (d, 2H), 7.60-7.55 (m, 4H).

Preparation Example 1-3: Preparation of 7H-dibenzo[c,g]fluorene

The solution, in which 7H-dibenzo[c,g]fluoren-7-one (641 mg, 2.29 mmol), $N_2H_4 \cdot H_2O$ (2.86 g, 57.2 mmol) prepared in the preparation example 1-2 and KOH (385 mg, 6.86 mmol) were dispersed in diethylene glycol (30 mL), was stirred at 170° C. for 3 hours. The reaction was terminated by adding 10% HCl at 0° C. and the resulting solid was filtered. Drying under vacuum gave 603 mg (99%) of 7H-dibenzo[c,g]fluorene, which is a dark brown solid compound having the following $^1$H-NMR spectrum.

$^1$H-NMR (CDCl$_3$, 300 MHz): δ 8.73 (d, 2H), 7.97 (d, 2H), 7.86 (d, 2H), 7.73 (d, 2H), 7.59-7.48 (m, 4H), 4.13 (s, 2H).

Preparation Example 1-4: Preparation of (7H-dibenzo[c, g]fluorene) lithium n-BuLi (980 mg, 2.30 mmol, 1.6 M in Hexane) was slowly added at −30° C. to a solution, in which 7-dibenzo [c,g]fluorene (585 mg, 2.20 mmol) prepared in the preparation example 1-3 was diluted in diethyl ether (50 mL), and the temperature was gradually raised to room temperature and stirred for 12 hours. The resulting solid was filtered and dried under vacuum to obtain 598 mg (100%) of (7H-dibenzo[c,g]fluorene) lithium, which is an ocher solid compound.

Preparation Example 1-5: Preparation of 2-Butyl-5-(1-methylethylidene)-1,3-cyclopentadiene A solution of 1-bromobutane (1.0 g, 7.30 mmol) diluted in hexane (5 mL) was slowly added at −30° C. to a solution, in which Sodium cyclopentadienylide (3.11 g, 6.63 mmol, 2.0 M in THF) was dispersed in hexane (10 mL), and then the temperature was gradually raised to room temperature and stirred for 12 hours. After completion of the reaction, the mixture was filtered with hexane to obtain a light brown filtrate. n-BuLi (2.96 g, 6.96 mmol, 1.6 M in Hexane) was slowly added at −30° C. to the filtrate, and the temperature was gradually raised to room temperature and stirred for 7 hours. A solution of acetone (770 mg, 13.3 mmol) diluted in hexane (2 mL) was slowly added at −30° C. to the reaction solution, and the temperature was gradually raised to room temperature and stirred for 12 hours. After completion of the reaction, extraction was performed with distilled water and pentane to separate the organic layer using a separatory funnel, and then column chromatography (pentane 100%) gave 308 mg (29%) of a yellow liquid compound having the following $^1$H-NMR spectrum.

$^1$H-NMR (CDCl$_3$, 300 MHz): δ 6.50-6.46 (m, 1H), 6.37-6.33 (m, 1H), 6.14 (s, 1H), 2.38 (t, 2H), 2.14 (s, 6H), 1.34-1.30 (m, 4H), 0.94-0.91 (m, 3H).

Preparation Example 1-6: Preparation of 7-(2-(4-butylcyclopenta-1,4-dien-1-yl) propan-2-yl)-7H-dibenzo[c,g]fluorene A solution, in which 2-Butyl-5-(1-methylethylidene)-1,3-cyclopentadiene (183 mg, 1.13 mmol) prepared in the preparation example 1-5 was diluted in diethyl ether (2 mL), was slowly added at −30° C. to a solution, in which (7H-dibenzo [c,g]fluorene) lithium (204 mg, 0.75 mmol) prepared in the preparation example 1-4 was dispersed in diethyl ether (5 mL), and then the temperature was gradually raised to room temperature and stirred for 12 hours. After completion of the reaction, the organic layer was separated by extraction with diethyl ether and aqueous NH4Cl. Column chromatography (hexane 100%) gave 211 mg (66%) of a light orange solid compound having the following $^1$H-NMR spectrum.

$^1$H-NMR (CDCl$_3$, 300 MHz): δ 8.61 (d, 2H), 7.95-7.90 (m, 2H), 7.75-7.68 (m, 2H), 7.52-7.46 (m, 4H), 7.37 (d, 1H)), 7.32 (d, 1H), 6.57-6.10 (m, 1H), 6.02-5.65 (m, 1H), 4.30 (d, 1H), 3.10 (t, 2H), 2.55-2.35 (m, 2H), 1.49-1.37 (m, 4H), 1.05 (d, 6H), 0.98-0.94 (m, 3H).

Preparation Example 1-7: Preparation of Isopropylidene [(3-n-butyl-2,4-cyclopentadienyl)-(7H-dibenzo[c, g]fluorenyl)] dilithium n-BuLi (440 mg, 1.03 mmol, 1.6 M in Hexane) was slowly added at −30° C. to a solution, in which 7-(2-(4-butylcyclopenta-1,4-dien-1-yl)propan-2-yl)-7H-dibenzo[c, g]fluorene (211 mg, 0.49 mmol) obtained in the preparation example 1-6 was diluted in diethyl ether (8 mL), and then the temperature was gradually raised to room temperature and stirred for 12 hours. The resulting solid was filtered and dried under vacuum to obtain 227 mg (105%, ether adduct) of a dark orange solid compound.

Preparation Example 1-8: Preparation of Isopropylidene [(3-n-butyl-2,4-cyclopentadienyl)-(7H-dibenzo[c,g]fluorenyl)] zirconium dichloride A solution, in which ZrCl4 (69 mg, 0.29 mmol) was dispersed in toluene (5 mL), was slowly added at −30° C. to a solution, in which Isopropylidene [(3-n-butyl-2,4-cyclopentadienyl)-(7H-dibenzo[c,g]fluorenyl)] dilithium (130 mg, 0.29 mmol) obtained in the preparation example 1-7 was dispersed in toluene (20 mL), and then the temperature was gradually raised to room temperature and stirred for 12 hours. After completion of the reaction, the mixture was extracted with toluene and filtered. 108 mg (62%) of Isopropylidene [(3-n-butyl-2,4-cyclopentadienyl)-(7H-dibenzo [c,g]fluorenyl)] zirconium dichloride (compound of the following chemical formula A), which is an orange solid compound having the following $^1$H-NMR spectrum, was obtained by washing with hexane after removing toluene under vacuum.

$^1$H-NMR (C$_6$D$_6$, 300 MHz): δ 9.10-9.06 (m, 2H), 7.70-7.65 (m, 2H), 7.62-7.52 (m, 2H), 7.35-7.28 (m, 6H), 5.97 (t, 1H), 5.54 (t, 1H), 5.41 (t, 1H), 2.40-2.32 (m, 2H), 1.90 (d, 6H), 1.16-1.08 (m, 4H), 0.72 (t, 3H).

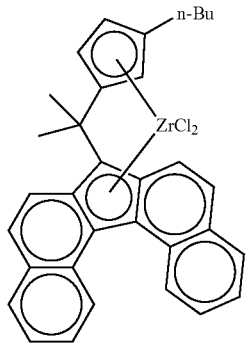

<chemical formula A>

<Preparation Example 2> Preparation of a Compound of Chemical Formula B

Preparation Example 2-1: Preparation of 2-butyl-5-cyclobutylidenecyclopenta-1,3-diene A solution of 1-bromobutane (1.91 g, 13.9 mmol) diluted in hexane (5 mL) was slowly added at −30° C. to a solution of sodium cyclopentadienylide (5.94 g, 12.7 mmol, 2.0 M in THF) dispersed in hexane (15 mL), and then the temperature was gradually raised to room temperature and stirred for 12 hours. After completion of the reaction, the mixture was filtered with hexane to obtain a light brown filtrate. n-BuLi (5.66 g, 13.3 mmol, 1.6 M in Hexane) was slowly added at −30° C. to the filtrate, and then the temperature was gradually raised to room temperature and stirred for 7 hours. A solution of cyclobutanone (1.33 g, 19.0 mmol) diluted in hexane (2 mL) was slowly added at −30° C. to the reaction solution, and the temperature was gradually raised to room temperature and stirred for 12 hours. After completion of the reaction, the organic layer was extracted by distilled water and pentane, and then separated using a separatory funnel, and 389 mg (18%) of a yellow liquid compound having the following $^1$H-NMR spectrum was obtained through column chromatography (pentane 100%).

$^1$H-NMR (CDCl$_3$, 300 MHz): δ 6.32-6.28 (m, 1H), 6.26-6.22 (m, 1H), 5.94-5.90 (m, 1H), 3.07 (t, 4H), 2.37 (t, 2H)), 2.17-2.10 (m, 2H), 1.40-1.31 (m, 4H), 0.95-0.90 (m, 3H).

Preparation Example 2-2: Preparation of 7-(1-(4-butylcyclopenta-1,4-dien-1-yl) cyclobutyl)-7H-dibenzo[c,g]fluorene A solution, in which 2-butyl-5-cyclobutylidenecyclopenta-1,3-diene (131 mg, 0.75 mmol) obtained in the preparation example 2-1 was diluted in diethyl ether (2 mL) was slowly added at −30° C. to a solution, in which (7H-dibenzo [c,g]fluorene) lithium (137 mg, 0.50 mmol) obtained in the preparation example 1-4 was dispersed in diethyl ether (5 mL), and then the temperature was gradually raised to room temperature and stirred for 12 hours. After completion of the reaction, the organic layer was separated by extraction with diethyl ether and aqueous NH$_4$Cl. 109 mg (49%) of a light orange solid compound having the following $^1$H-NMR spectrum was obtained through column chromatography (hexane 100%).

$^1$H-NMR (CDCl$_3$, 300 MHz): δ 8.55-8.48 (m, 2H), 7.95-7.90 (m, 2H), 7.84-7.73 (m, 4H), 7.53-7.43 (m, 4H), 5.65-5.46 (m, 1H), 5.40-5.22 (m, 1H), 4.40 (d, 1H), 2.94-2.82 (m, 2H), 2.52-2.43 (m, 2H), 2.24 (s, 1H), 2.08-1.92 (m, 2H), 1.81 (s, 1H), 0.90-0.77 (m, 4H), 0.76-0.71 (m, 2H), 0.62-0.53 (m, 3H).

Preparation Example 2-3: Preparation of Cyclobutylidene [(3-n-butyl-2,4-cyclopentadienyl)-(7H-dibenzo[c,g]fluorenyl)] dilithium n-BuLi (221 mg, 0.52 mmol, 1.6 M in Hexane) was slowly added at −30° C. to a solution, in which 7-(1-(4-butylcyclopenta-1,4-dien-1-yl)cyclobutyl)-7H-dibenzo[c,g] fluorene (109 mg, 0.25 mmol) obtained in the preparation example 2-2 was diluted in diethyl ether (8 mL), and then the temperature was gradually raised to room temperature and stirred for 12 hours. The resulting solid was filtered and dried under vacuum to obtain 121 mg (108%, ether adduct) of a reddish-brown solid compound.

Preparation Example 2-4: Preparation of Cyclobutylidene [(3-n-butyl-2,4-cyclopentadienyl)-(7H-dibenzo[c,g]fluorenyl)] zirconium dichloride A solution of ZrCl$_4$ (59 mg, 0.25 mmol) dispersed in toluene (5 mL) was slowly added at −30° C. to a solution, in which Cyclobutylidene [(3-n-butyl-2,4-cyclopentadi-enyl)-(7H-dibenzo[c,g]fluorenyl)] dilithium (114 mg, 0.25 mmol) obtained in the preparation example 2-3 was dispersed in toluene (15 mL), and then the temperature was gradually raised to room temperature and stirred for 12 hours. After completion of the reaction, the mixture was extracted with toluene and filtered. 78 mg (52%) of Cyclobutylidene [(3-n-butyl-2,4-cyclopentadienyl)-(7H-dibenzo[c,g]fluorenyl)] zirconium dichloride (compound of the following chemical formula B), which is a brown solid compound having the following $^1$H-NMR spectrum, was obtained by washing with hexane after removing toluene under vacuum.

$^1$H-NMR (C$_6$D$_6$, 300 MHz): δ 9.16 (d, 2H), 7.71 (t, 2H), 7.40-7.31 (m, 8H), 5.99 (t, 1H), 5.58 (t, 1H), 5.44 (t, 1H), 3.00-2.86 (m, 2H), 2.70-2.60 (m, 2H), 2.42-2.32 (m, 2H), 1.96-1.82 (m, 2H), 1.14-1.08 (m, 4H), 0.71 (t, 3H).

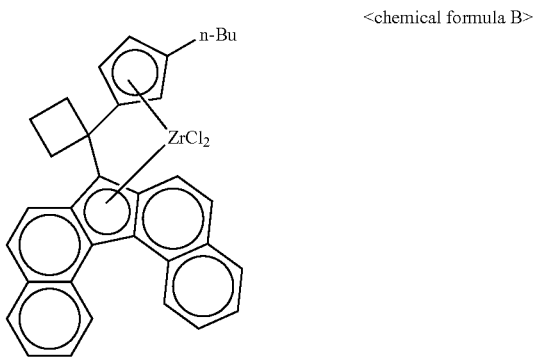

<chemical formula B>

<Preparation Example 3> Preparation of a Compound of Chemical Formula C

Preparation Example 3-1: Preparation of 2,2-[(cyclopentadienyl)-(7H-dibenzo [c,g]fluorenyl)]propane A solution of 6,6-dimethylfulvene (522 mg, 4.92 mmol) diluted in diethyl ether (5 mL) was slowly added at −78° C. to a solution, in which (7H-dibenzo[c,g]fluorene) lithium (893 mg, 3.28 mmol) obtained in the preparation example 1-4 was dispersed in diethyl ether (35 mL), and then the temperature was gradually raised to room temperature and stirred for 12 hours. After completion of the reaction, the organic layer was separated by extraction with diethyl ether and aqueous NH4Cl. 907 mg (74%) of a light brown solid compound having the following $^1$H-NMR spectrum was obtained through column chromatography (hexane 100%).

$^1$H-NMR (CDCl$_3$, 300 MHz): δ 8.61 (d, 2H), 7.91 (d, 2H), 7.74-7.66 (m, 2H), 7.52-7.46 (m, 4H), 7.41 (d, 1H), 7.32 (d, 1H), 7.00-6.64 (m, 1H), 6.57-6.45 (m, 1H), 6.16-5.87 (m, 1H), 4.33 (d, 1H), 3.24-3.08 (m, 2H), 1.08 (d, 6H).

Preparation Example 3-2: Preparation of Isopropylidene [(cyclopentadienyl)-(7H-dibenzo[c,g]fluorenyl)] dilithium n-BuLi (1.24 mg, 2.93 mmol, 1.6 M in Hexane) was slowly added at −30° C. to a solution, in which 2,2-[(cyclopentadienyl)-(7H-dibenzo[c,g]fluorenyl)] propane (519 mg, 1.39 mmol) obtained in the preparation example 3-1 was diluted in diethyl ether (10 mL), and then the temperature was gradually raised to room temperature and stirred for 12 hours. The resulting solid was filtered and dried under vacuum to obtain 600 mg (112%, ether adduct) of a yellow solid compound.

Preparation Example 3-3: Preparation of Isopropylidene [(cyclopentadienyl)-(7H-dibenzo[c,g]fluorenyl)] zirconium dichloride A solution of ZrCl$_4$ (107 mg, 0.46 mmol) dispersed in toluene (5 mL) was slowly added at −30° C. to a solution, in which Isopropylidene [(cyclopentadienyl)-(7H-dibenzo [c,g]fluorenyl)] dilithium (176 mg, 0.46 mmol) obtained in the preparation example 3-2 was dispersed in toluene (20 mL), and then the temperature was gradually raised to room temperature and stirred for 12 hours. After completion of the reaction, the mixture was extracted with toluene and filtered. 107 mg (44%) of Isopropylidene [(cyclopentadienyl)-(7H-dibenzo[c,g]fluorenyl)] zirconium dichloride (compound of the following chemical formula C), which is a red-brown solid compound having the following $^1$H-NMR spectrum, was obtained by washing with hexane after removing toluene under vacuum.

$^1$H-NMR (CDCl3, 300 MHz): δ 8.87 (d, 2H), 7.95-7.84 (m, 4H), 7.62-7.50 (m, 6H), 6.37 (t, 2H), 5.94 (t, 2H), 2.48 (s, 6H).

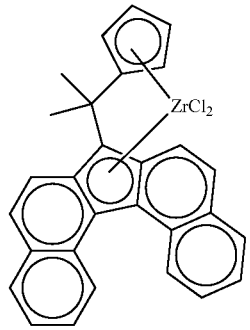

<chemical formula C>

<Preparation Example 4> Preparation of a Compound of Chemical Formula D

Preparation Example 4-1: Preparation of 9-[1-(2,4-Cyclopentadien-1-yl)-1-cyclobutyl]-7H-dibenzo[c,g] fluorene A solution of 5-cyclobutylidene-1,3-cyclopentadiene (518 mg, 4.38 mmol) diluted in diethyl ether (10 mL) was slowly added at −30° C. a solution, in which (7H-dibenzo[c,g] fluorene) lithium (596 mg, 2.19 mmol) obtained in the preparation example 1-4 was dispersed in diethyl ether (35 mL), and then the temperature was gradually raised to room temperature and stirred for 3 days. After completion of the reaction, the organic layer was separated by extraction with diethyl ether and aqueous NH$_4$Cl. Recrystallization with Hexane gave 654 mg (78%) of a white solid compound having the following $^1$H-NMR spectrum.

$^1$H-NMR (CDCl$_3$, 300 MHz): δ 8.56-8.47 (m, 2H), 7.95-7.89 (m, 2H), 7.79-7.76 (m, 4H), 7.50-7.44 (m, 4H), 5.96-5.81 (m, 1H), 5.74-5.67 (m, 1H), 5.59-5.50 (m, 1H), 4.42 (d, 1H), 2.99-2.79 (m, 2H), 2.58-2.44 (m, 2H), 2.39-2.02 (m, 2H), 2.01-1.94 (m, 2H).

Preparation Example 4-2: Preparation of Cyclobutylidene [(cyclopentadienyl)-(7H-dibenzo[c, g]fluorenyl)] dilithium n-BuLi (688 mg, 1.62 mmol, 1.6 M in Hexane) was slowly added at −30° C. to a solution, in which 9-[1-(2,4-Cyclopentadien-1-yl)-1-cyclobutyl]-7H-dibenzo[c,g] fluorene (296 mg, 0.77 mmol) obtained in the preparation example 4-1 was diluted in diethyl ether (35 mL), and then the temperature was gradually raised to room temperature and stirred for 12 hours. The resulting solid was filtered and dried under vacuum to obtain 325 mg (112%, ether adduct) of an ocher solid compound.

Preparation Example 4-3: Preparation of Cyclobutylidene [(cyclopentadienyl)-(7H-dibenzo[c, g]fluorenyl)] zirconium dichloride A solution of ZrCl$_4$ (74 mg, 0.32 mmol) dispersed in toluene (3 mL) was slowly added at −30° C. to a solution, in which Cyclobutylidene [(cyclopentadienyl)-(7H-dibenzo [c,g]fluorenyl)] dilithium (127 mg, 0.32 mmol) obtained in the preparation example 4-2 was dispersed in toluene (10 mL), and then the temperature was gradually raised to room temperature and stirred for 12 hours. After completion of the reaction, the mixture was extracted with toluene and filtered.

128 mg (74%) of Cyclobutylidene [(cyclopentadienyl)-(7H-dibenzo[c,g]fluorenyl)] zirconium dichloride (compound of the following chemical formula D), which is an orange solid compound having the following $^1$H-NMR spectrum, was obtained by washing with hexane after removing toluene under vacuum.

$^1$H-NMR (C$_6$D$_6$, 300 MHz): δ 9.15 (d, 2H), 7.72 (d, 2H), 7.42-7.30 (m, 8H), 6.11 (t, 2H), 5.52 (t, 2H), 2.92-2.82 (m, 2H), 2.60 (t, 2H), 2.28-2.16 (m, 1H), 1.92-1.82 (m, 1H).

<chemical formula D>

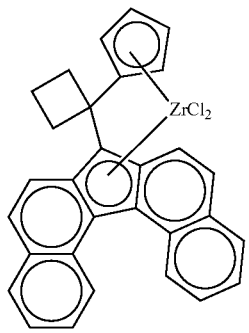

Olefin Polymerization Example (Preparation of ethylene/1-octene Copolymer)

<Example 1> Synthesis of ethylene and 1-hexene Copolymer Using an Olefin Polymerization Catalyst Comprising the Compound of Chemical Formula A Ethylene and 1-hexene were copolymerized as follows using an olefin polymerization catalyst including the compound of chemical formula A prepared in the preparation example 1.

The polymerization reaction was carried out in a 2 L autoclave reactor, and catalyst weight measurement and alkyl aluminum quantification were performed under a nitrogen atmosphere using a glove box or schlenk technique.

First, the temperature of the reactor was set to 100° C., and foreign substances such as moisture and oxygen were removed by vacuum for about 20 minutes. Next, 1 L of 1-hexene was injected into the reactor and stirred at 200 rpm to increase to 80° C. of the polymerization temperature. The olefin polymerization catalyst (0.8 mg) comprising the compound of chemical formula A prepared in the preparation example 1 and "catalyst+MAO," which was pre-contacted at an Al/Zr=2000 ratio, were added, and in this case, MAO was 10 wt % MAO in toluene of Lake was used.

Nitrogen was injected so that the atmospheric pressure in the reactor including the hexene vapor pressure became 1 kgf/cm2, and then 4 kgf/cm2 of ethylene was injected to adjust the total atmospheric pressure in the reactor to 5 kgf/cm2. Thereafter, 1-hexene was added while the reactor was stirred at 1000 rpm, and polymerization was performed for 15 minutes. During the polymerization reaction, the heat of reaction was removed through a cooling coil inside the reactor to maintain the polymerization temperature as constant as possible at 80° C.

After the polymerization reaction, the remaining gas was taken out and the reactor was opened to obtain the resulting polymer resin. The obtained polymer resin was washed 2-3 times, and then dried to obtain a [ethylene]-[1-hexene] copolymer.

<Example 2> Synthesis of ethylene and 1-hexene Copolymer Using an Olefin Polymerization Catalyst Comprising the Compound of Chemical Formula B Ethylene and 1-hexene were copolymerized as follows using an olefin polymerization catalyst comprising the compound of chemical formula B prepared in the preparation example 2

The same procedure as in Example 1 was carried out, except that the transition metal compound of the chemical formula B of the preparation example 2 was used, to obtain a [ethylene]-[1-hexene] copolymer.

<Comparative Example 1> Synthesis of ethylene and 1-hexene Copolymer Using an Olefin Polymerization Catalyst Comprising the Compound of Chemical Formula C Ethylene and 1-hexene were copolymerized as follows using an olefin polymerization catalyst comprising the compound of chemical formula C prepared in the preparation example 3.

The same procedure as in Example 1 was carried out, except that the transition metal compound of the chemical formula C of the preparation example 3 was used and 1.6 mg of an olefin polymerization catalyst was used, to obtain an [ethylene]-[1-hexene] copolymer.

<Comparative Example 2> Synthesis of ethylene and 1-hexene Copolymer Using an Olefin Polymerization Catalyst Comprising the Compound of Chemical Formula D Ethylene and 1-hexene were copolymerized as follows using an olefin polymerization catalyst comprising the compound of chemical formula D prepared in the preparation example 4

The same procedure as in Example 1 was carried out, except that the transition metal compound of the chemical formula D of the preparation example 4 was used and 1.6 mg of an olefin polymerization catalyst was used, to obtain a [ethylene]-[1-hexene] copolymer.

Experimental Example

The catalyst activity and other physical properties for the polymers prepared in the examples 1 and 2 and preparation examples 1 and 2, respectively, were measured and are shown in Table 1 below.

TABLE 1

| | C6 (ml) | Catalyst (mg) | Activity (T/mol·h) | Activity gPE/gcat·h | Mw | PDI | Density (g/cm³) | Tm (°C.) | Branch Number | $^{13}$C-NMR Mol (%) | wt (%) |
|---|---|---|---|---|---|---|---|---|---|---|---|
| Example 1 | 0 | 0.8 | 88.31 | 150,000 | 91,310 | 17.63 | 0.947 | 116.31 | — | — | — |
| | 15 | 0.8 | 176.62 | 300,000 | 48,001 | 2.57 | N.D. | 92.04 | 9.01 | 1.80 | 5.22 |
| | 30 | 0.8 | 217.83 | 370,000 | 43,945 | 3.33 | N.D. | 91.93 | 18.54 | 3.71 | 10.36 |
| | 45 | 0.8 | 197.22 | 335,000 | 35,294 | 2.77 | 0.907 | 100.72 | 25.24 | 5.05 | 13.75 |
| Example 2 | 0 | 1.6 | 51.06 | 85,000 | 205,247 | 4.60 | 0.943 | 116.26 | — | — | — |
| | 15 | 0.8 | 174.21 | 290,000 | 58,883 | 2.38 | 0.916 | 97.87 | 10.24 | 2.05 | 5.90 |
| | 30 | 0.8 | 183.22 | 305,000 | 38,996 | 1.86 | 0.902 | 86.93 | 22.87 | 4.57 | 12.57 |
| | 45 | 0.8 | 138.17 | 230,000 | 31,236 | 3.14 | 0.894 | 79.76 | 28.37 | 5.67 | 15.29 |
| Comparative Example 1 | 0 | 1.6 | 37.28 | 70,000 | 179,531 | 4.26 | 0.945 | 116.43 | — | — | — |
| | 15 | 1.6 | 47.93 | 90,000 | 52,009 | 1.98 | 0.928 | 104.88 | 10.51 | 2.10 | 6.05 |
| | 30 | 1.6 | 75.90 | 142,500 | 48,709 | 1.26 | 0.913 | 93.18 | 19.68 | 3.94 | 10.95 |
| | 45 | 1.6 | 33.29 | 62,500 | 24,370 | 1.95 | N.D. | 81.42 | 31.51 | 6.30 | 16.79 |
| Comparative Example 2 | 0 | 1.6 | 50.38 | 92,500 | 258,434 | 5.32 | 0.939 | 116.16 | — | — | — |
| | 15 | 1.6 | 102.12 | 187,500 | 79,136 | 2.25 | 0.914 | 96.16/94.04 | 14.29 | 2.86 | 8.11 |
| | 30 | 1.6 | 98.03 | 180,000 | 46,713 | 2.06 | 0.894 | 112.69/85.09 | 27.51 | 5.50 | 14.87 |
| | 45 | 1.6 | 77.61 | 142,500 | 38,499 | 1.84 | 0.882 | 113.01/84.81/70.64 | 32.20 | 6.44 | 17.12 |

As shown in Table 1, it can be seen that the polymer prepared using an olefin polymerization catalyst comprising the compound of chemical formula A and the compound of chemical formula B has a high polymerization activity compared to the polymer prepared using an olefin polymerization catalyst comprising the compound of chemical formula C and the compound of chemical formula D. In the above, embodiments belonging to the spirit of the invention have been described in detail with reference to the illustrated chemical structural formulas and preparation examples. However, the spirit of the invention is not limited to the illustrated chemical structural formulas and preparation examples, and the spirit of the invention may be variously modified based on the illustrated chemical structural formulas and preparation examples. The illustrated chemical structural formulas, preparation examples, and the like are provided to completely inform those in the art to which the invention pertains on the scope of the spirit of the invention, and the scope of rights of the spirit of the invention is only defined by the scope of the claims. Therefore, it should be understood that the embodiments described above are illustrative in all respects and not restrictive.

What is claimed is:

1. A transition metal compound for an olefin polymerization catalyst represented by the following chemical formula 1-1 or chemical formula 1-2:

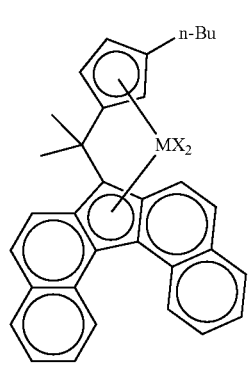

<chemical formula 1-1>

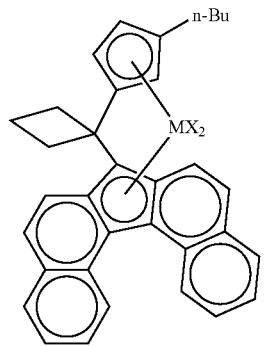

<chemical formula 1-2> where, in the chemical formula 1-1 and chemical formula 1-2,

M is zirconium or hafnium, and

X is each independently halogen or $C_{1-20}$ alkyl.

2. The transition metal compound for an olefin polymerization catalyst of claim 1, wherein the chemical formula 1-1 or chemical formula 1-2 is the following chemical formula A or chemical formula B:

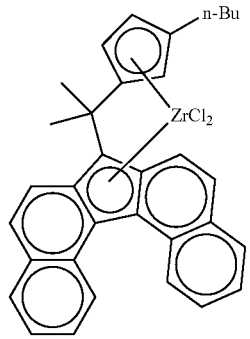

<chemical formula A>

-continued

<chemical formula B>

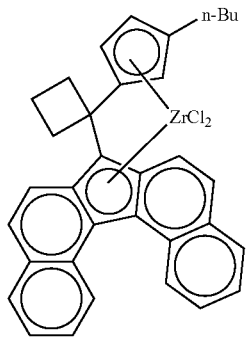

3. An olefin polymerization catalyst comprising:
a transition metal compound represented by the following chemical formula 1-1 or chemical formula 1-2; and
a cocatalyst compound, <chemical formula 1-1>

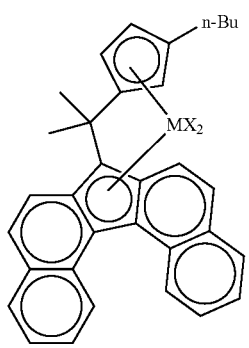

<chemical formula 1-2>

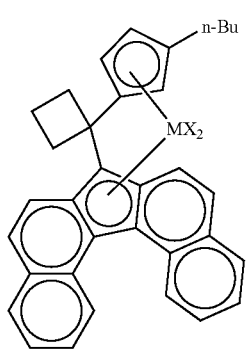

where, in the chemical formula 1-1 and chemical formula 1-2,

M is zirconium or hafnium,

X is each independently halogen or $C_{1-20}$ alkyl.

4. The olefin polymerization catalyst of claim 3, wherein the cocatalyst compound comprises at least one of a compound represented by the following chemical formula I, a compound represented by the chemical formula II and a compound represented by the chemical formula III:

<chemical formula I>

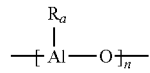

In the chemical formula A, n is an integer of 2 or more, $R_a$ is a halogen atom, a $C_{1-20}$ hydrocarbon group or a $C_{1-20}$ hydrocarbon group substituted with halogen <chemical formula II>

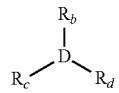

In the chemical formula B, D is aluminum (Al) or boron (B), $R_b$, $R_c$ and $R_d$ are each independently a halogen atom, a $C_{1-20}$ hydrocarbon group, a $C_{1-20}$ hydrocarbon group substituted with halogen or a $C_{1-20}$ alkoxy group $[L-H]^+[Z(A)_4]^-$ or $[L]^+[Z(A)_4]^-$ <chemical formula III>

In the chemical formula C, L is a neutral or cationic Lewis base, $[L-H]^+$ and $[L]^+$ are Brønsted acids Z is a group 13 element, A is each independently a substituted or unsubstituted $C_{6-20}$ aryl group or a substituted or unsubstituted $C_{1-20}$ alkyl group.

* * * * *